United States Patent
Provaznik

(10) Patent No.: US 11,959,235 B2
(45) Date of Patent: Apr. 16, 2024

(54) SYSTEM AND METHOD FOR TRACKING AND RECORDING LOCATIONS OF ROAD BARRIERS

(71) Applicant: LINDSAY TRANSPORTATION SOLUTIONS, LLC, Omaha, NE (US)

(72) Inventor: Richard Edward Provaznik, Omaha, NE (US)

(73) Assignee: Lindsay Transportation Solutions, LLC, Omaha, NE (US)

( * ) Notice: Subject to any disclaimer, the term of this patent is extended or adjusted under 35 U.S.C. 154(b) by 201 days.

(21) Appl. No.: 16/911,786

(22) Filed: Jun. 25, 2020

(65) Prior Publication Data
US 2021/0404130 A1 Dec. 30, 2021

(51) Int. Cl.
| | | |
|---|---|---|
| E01F 13/04 | (2006.01) | |
| B60P 3/40 | (2006.01) | |
| B60W 40/06 | (2012.01) | |
| G01S 19/14 | (2010.01) | |
| G06V 20/56 | (2022.01) | |

(52) U.S. Cl.
CPC ............... E01F 13/04 (2013.01); B60P 3/40 (2013.01); B60W 40/06 (2013.01); G01S 19/14 (2013.01); G06V 20/588 (2022.01); B60W 2420/42 (2013.01); B60W 2552/50 (2020.02)

(58) Field of Classification Search
CPC .......... E01F 13/04; G06V 20/588; B60P 3/40; B60W 40/06; B60W 2552/50; B60W 2420/42; G01S 19/14
USPC .......................................................... 404/6
See application file for complete search history.

(56) References Cited

U.S. PATENT DOCUMENTS

| | | | |
|---|---|---|---|
| 5,549,412 A | 8/1996 | Malone | |
| 6,220,780 B1 | 4/2001 | Schindler et al. | |
| 2005/0149251 A1* | 7/2005 | Donath | G01C 21/26 340/995.14 |
| 2007/0299603 A1* | 12/2007 | Kirby | G01C 21/28 701/408 |
| 2014/0255096 A1* | 9/2014 | Schmidt | E01F 15/006 404/73 |
| 2019/0293435 A1* | 9/2019 | Mori | G08G 1/167 |
| 2020/0013287 A1* | 1/2020 | Kaneko | G07C 5/008 |
| 2020/0260405 A1* | 8/2020 | Koudouridis | H04W 4/02 |

FOREIGN PATENT DOCUMENTS

| | | |
|---|---|---|
| CN | 207260024 | 4/2018 |
| JP | 2000331005 | * 11/2000 |
| WO | 2019-086842 | 5/2019 |

OTHER PUBLICATIONS

Westchester County GIS Road Barriers, Westchester County GIS, May 2, 2019 (Year: 2019).*

(Continued)

*Primary Examiner* — Elaine Gort
*Assistant Examiner* — Matthias S Weisfeld
(74) *Attorney, Agent, or Firm* — Hovey Williams LLP

(57) ABSTRACT

A barrier transfer machine includes a moveable chassis, an entry snout, an exit snout, a conveyor system, and a tracking system that tracks and records the locations of road barriers as they are placed on a road surface so that the last locations of the barriers can be established for evidentiary purposes and/or for alerting operators or others of mis-positioned road barriers.

19 Claims, 17 Drawing Sheets

(56) References Cited

OTHER PUBLICATIONS

Westchester County GIS Road Barriers, Westchester Country GIS, May 2, 2019 (Year: 2019).*
Traffic Barrier Data Collection Guide, Oregon Department of Transportation, Jun. 2020 (Year: 2020).*
International Search Report and Written Opinion for PCT Appln. No. PCT/US2021/038357, dated Sep. 29, 2021.

* cited by examiner

SYSTEM AND METHOD FOR TRACKING AND RECORDING LOCATIONS OF ROAD BARRIERS

BACKGROUND

Moveable road barrier systems are often placed on roadways to create traffic barriers between opposing lanes of traffic. Unlike permanent barriers, moveable road barrier systems may be picked up and repositioned by barrier transfer machines to make more efficient use of space, increase vehicle capacity, and reduce traffic congestion. For example, a barrier transfer machine may move a road barrier system back and forth between lanes of a roadway throughout the day to provide more lanes in directions of peak traffic and/or to create work zone space for construction crews.

Precise placement of road barrier systems is critical because they are typically installed adjacent busy traffic lanes and therefore can impede traffic flow and even cause collisions if they are improperly placed. Unfortunately, precise placement of road barriers is sometimes difficult for a variety of reasons, especially for inexperienced operators. Even when they are properly positioned, road barrier systems are sometimes struck by vehicles. Establishing fault in such collisions is difficult because the vehicle impact moves the barriers and prevents investigators from determining whether the road barrier systems were properly positioned before the collisions.

SUMMARY

The present invention solves the above-described problems and related problems and provides a distinct advance in the art of road barrier transfer machines. More particularly, the invention provides a road barrier transfer machine with a tracking system that tracks and records the locations of road barriers as they are placed on a road surface so the last locations of the barriers can be established for evidentiary purposes and/or for alerting operators or others of mis-positioned road barriers.

A barrier transfer machine constructed in accordance with an embodiment of the invention broadly comprises a moveable chassis, an entry snout, an exit snout, a conveyor system, and the above-mentioned tracking system.

The chassis has a forward and rearward ends and rides on wheels, belts, or other ground-engaging traction elements that are driven by conventional engines, transmissions, and associated mechanical and electrical components. In one embodiment, two operator cabs are supported on the chassis, one at each end of the chassis. The machine can be driven in either direction, but typically only one of the cabs can be in charge of the capstan system controls at any one time. Other embodiments of the machine may have only one cab or even no cab at all, instead being controlled remotely or autonomously.

Both snouts of the barrier transfer machine can pick up and put down the road barriers because either end of the machine can be in the front. As used herein, the entry snout is defined as the snout on the end of the chassis that is currently in front and that picks up the road barrier span from a first location on a road surface, and the exit snout is defined as the snout on the on the end of the chassis that is currently in the rear and places the span back onto the road surface in a second location different from the first location.

The conveyor system extends beneath the chassis and transports the road barriers from the entry snout to the exit snout. In one embodiment, the conveyor system consists of an "S" shaped structural frame attached to the bottom of the chassis and an array of bogeys supported by the frame that pick up and carry the barriers through the machine during the transfer operation.

In accordance with important aspects of the invention, the tracking system tracks and records the locations of the road barriers as they are placed on a road surface by the barrier transfer machine so the last locations of the barriers can be established for evidentiary purposes and/or for alerting operators or others of mis-positioned road barriers. An embodiment of the tracking system comprises at least one location sensor and a processing system.

The location sensor is mounted on the barrier transfer machine and senses the locations of the road barriers as they are placed on a road surface. In one embodiment, the location sensor is a GPS receiver mounted on the rear of the barrier transfer machine for sensing geographic coordinates of the barriers as they are placed on the road surface. In other embodiments, the location sensor may be a camera for capturing images of the road barriers as they are placed onto the road surface. In other embodiments, both a GPS receiver and a camera may be used to sense the locations of the road barriers.

The processing system receives data from the location sensor or sensors and stores location data representative of the current locations of the road barriers. The processing system may also store date/time data representative of when the road barriers were placed on the road surface. This data may be stored in resident memory of the processing system or in external memory and later accessed to provide evidence of the locations of the barriers at any day and time. For example, if the barriers are stuck by a vehicle, the data associated with the day and time of the collision may be accessed to determine where the barriers were located immediately before the collision. The tracking system therefore provides a searchable log of the locations of the barriers on any day and time. The tracking system may also be used for training purposes to assist with training operators of the barrier transfer machine.

In some embodiments, the processing system is further configured for comparing the current locations of the road barriers to reference location data to determine if the road barriers are currently mis-positioned. If they are mis-positioned, the processing system may generate an alert signal. The alert signal may trigger an alarm, display, or instructions on a user interface in the barrier transfer machine so that an operator may reposition the barriers or take other corrective action. Alternatively, the alert signal may be sent to a remote computer or control station.

Because the road barriers may be placed on bridges, which may sway, shift, or otherwise move over time, the processing system may also correct or augment the location data as necessary to account for any such movement. In one embodiment, this may be accomplished by receiving current location data from one or more GPS receivers or other global navigation satellite system (GNSS) receivers mounted to the bridge, comparing such current location data to reference location data for the bridge, and generating correction factors that may be used to correct or augment the location data for the road barriers. The reference location data may be data representative of the steady-state location of the bridge, i.e., the location of the bridge when in its initial non-moved position.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
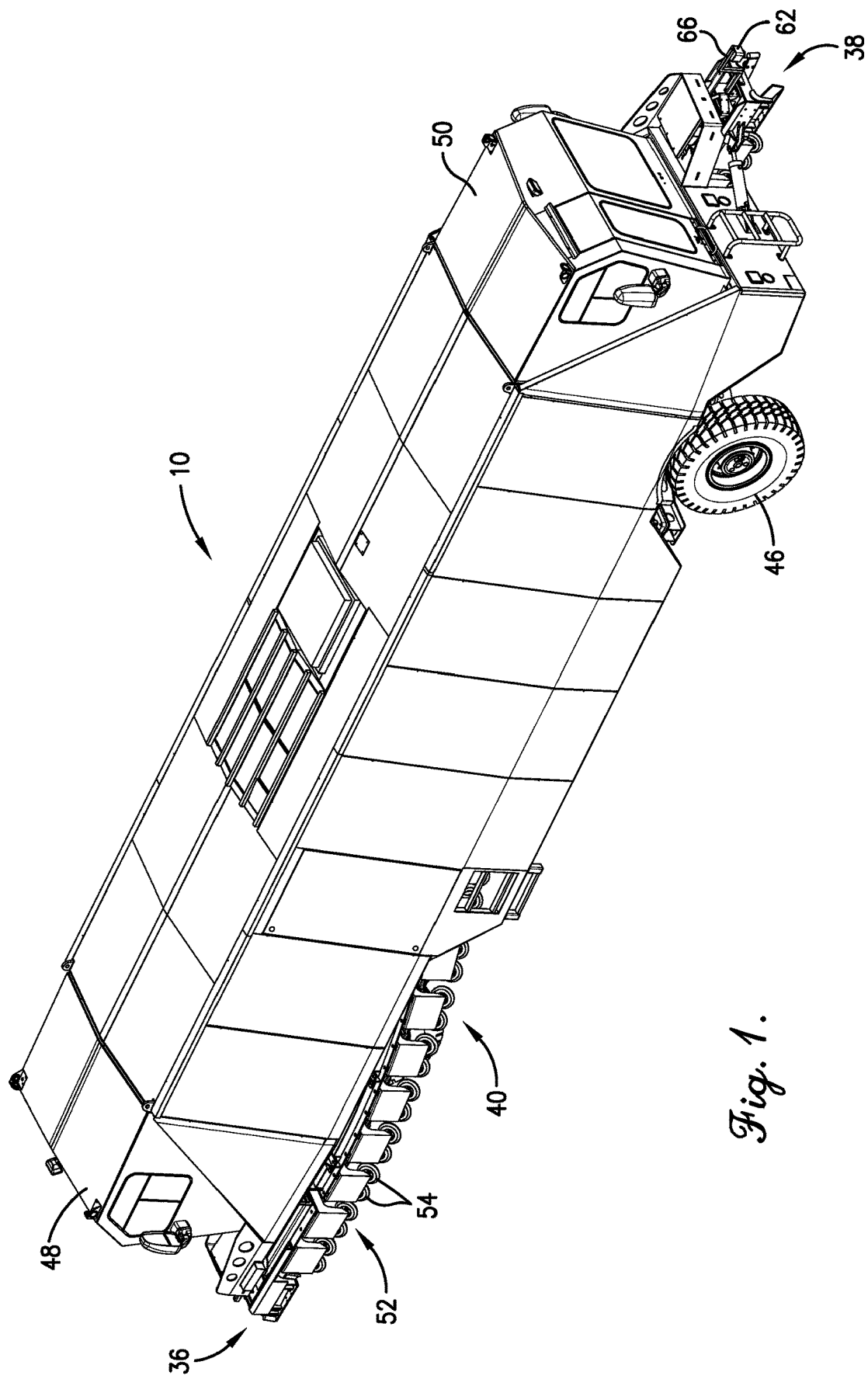
FIG. 1 is a top perspective view of a barrier transfer machine constructed in accordance with embodiments of the present invention.
Figure 2:
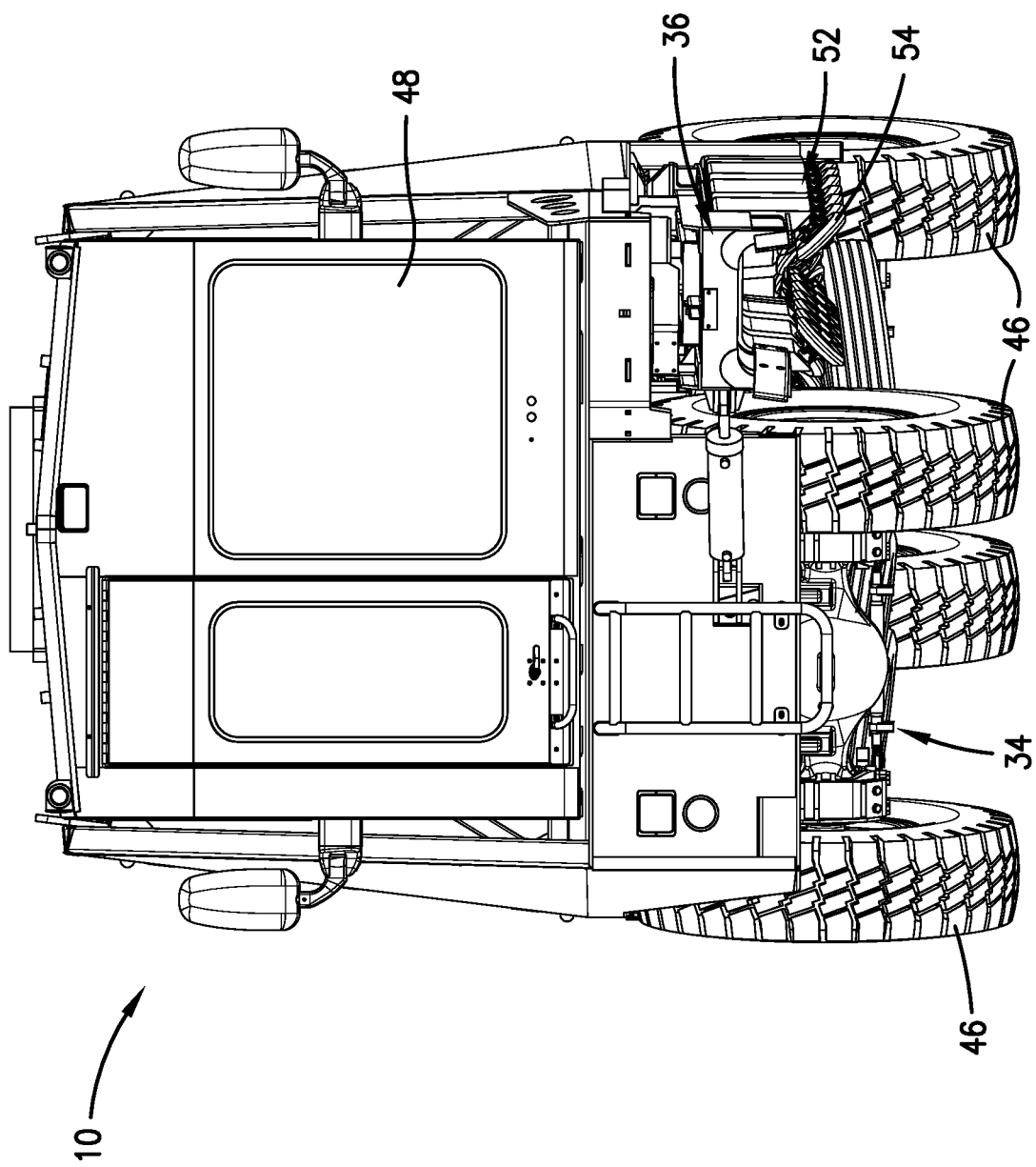
FIG. 2 is a front or rear view of the barrier transfer machine.

The drawing figures do not limit the present invention to the specific embodiments disclosed and described herein. The drawings are not necessarily to scale, emphasis instead being placed upon clearly illustrating the principles of the invention.

DETAILED DESCRIPTION

Figure 6:
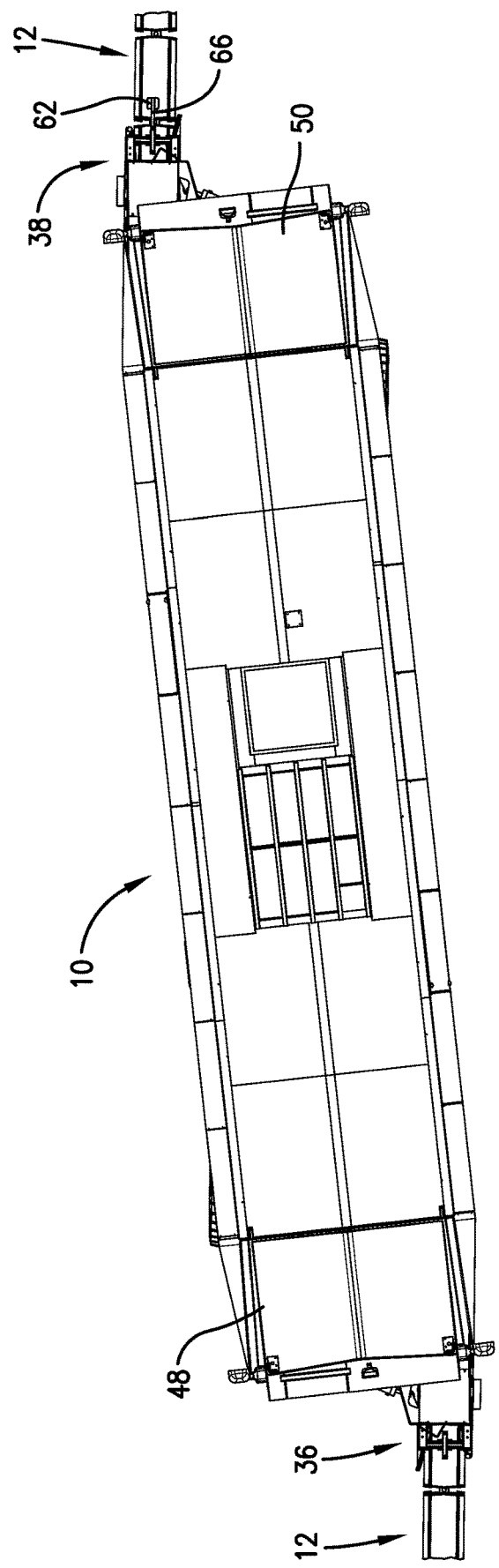
FIG. 6 is a top view of the barrier transfer machine shown moving a road barrier span from one side of a roadway to another side.

Turning now to the drawing figures, a barrier transfer machine 10 constructed in accordance with embodiments of the invention is depicted. As best shown in FIG. 6, the barrier transfer machine 10 is configured for picking up and repositioning a span 12 of interconnected road barriers to provide more lanes in directions of peak traffic, to create work zone space for construction crews, or to otherwise make more efficient use of roadway space, increase vehicle capacity, and/or reduce traffic congestion.

Figure 15:
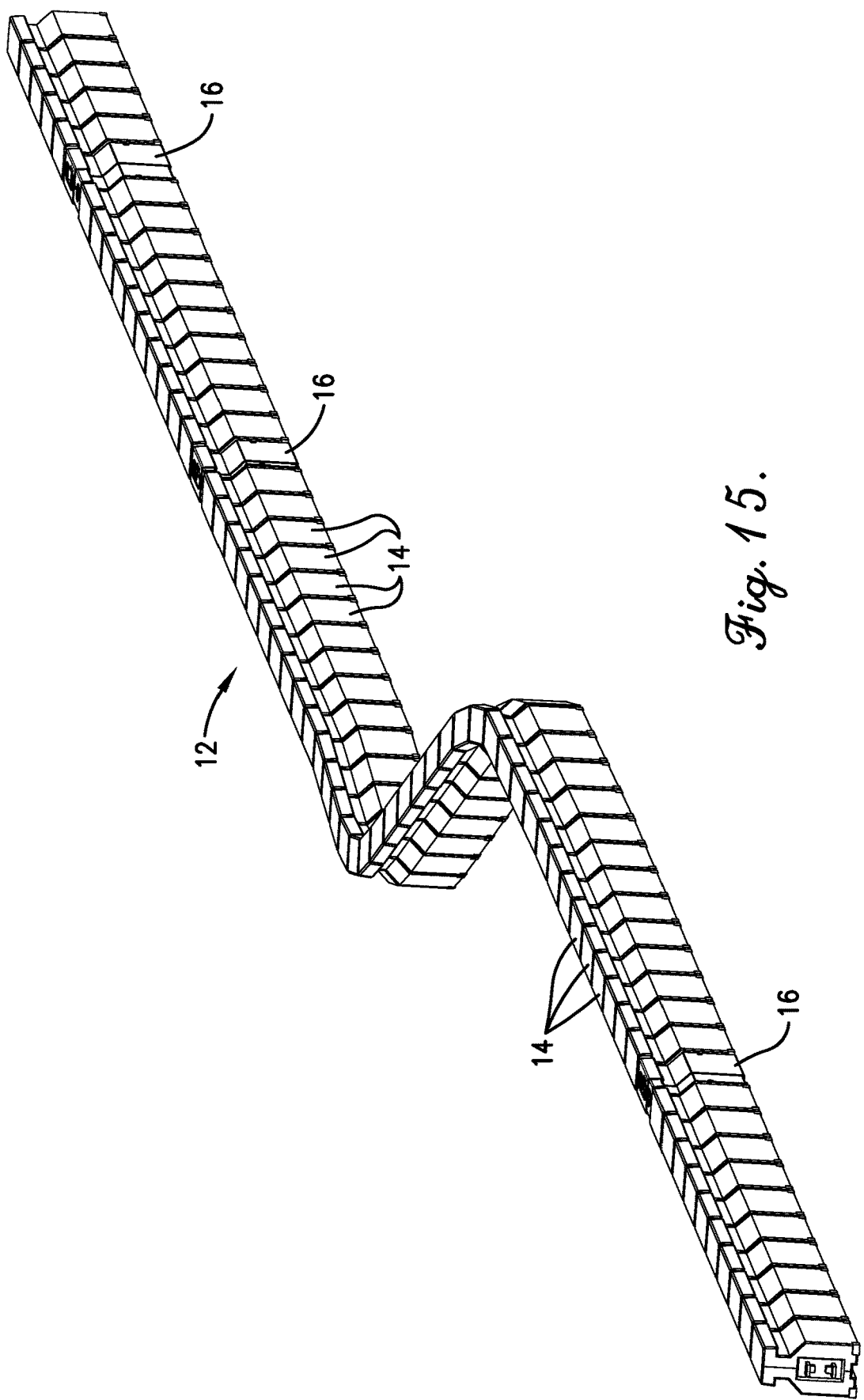
FIG. 15 is a perspective view of an exemplary road barrier span.

An exemplary span of road barriers 12 that may be picked up and repositioned by the barrier transfer machine 10 is depicted in FIG. 15. The span 12 may be any length and may include any number of fixed-length road barriers 14 and variable length barriers 16. In some embodiments, the barriers 14, 16 are connected end-to-end with steel pins and/or tensioning hinge mechanisms described in more detail below.

Figure 9:
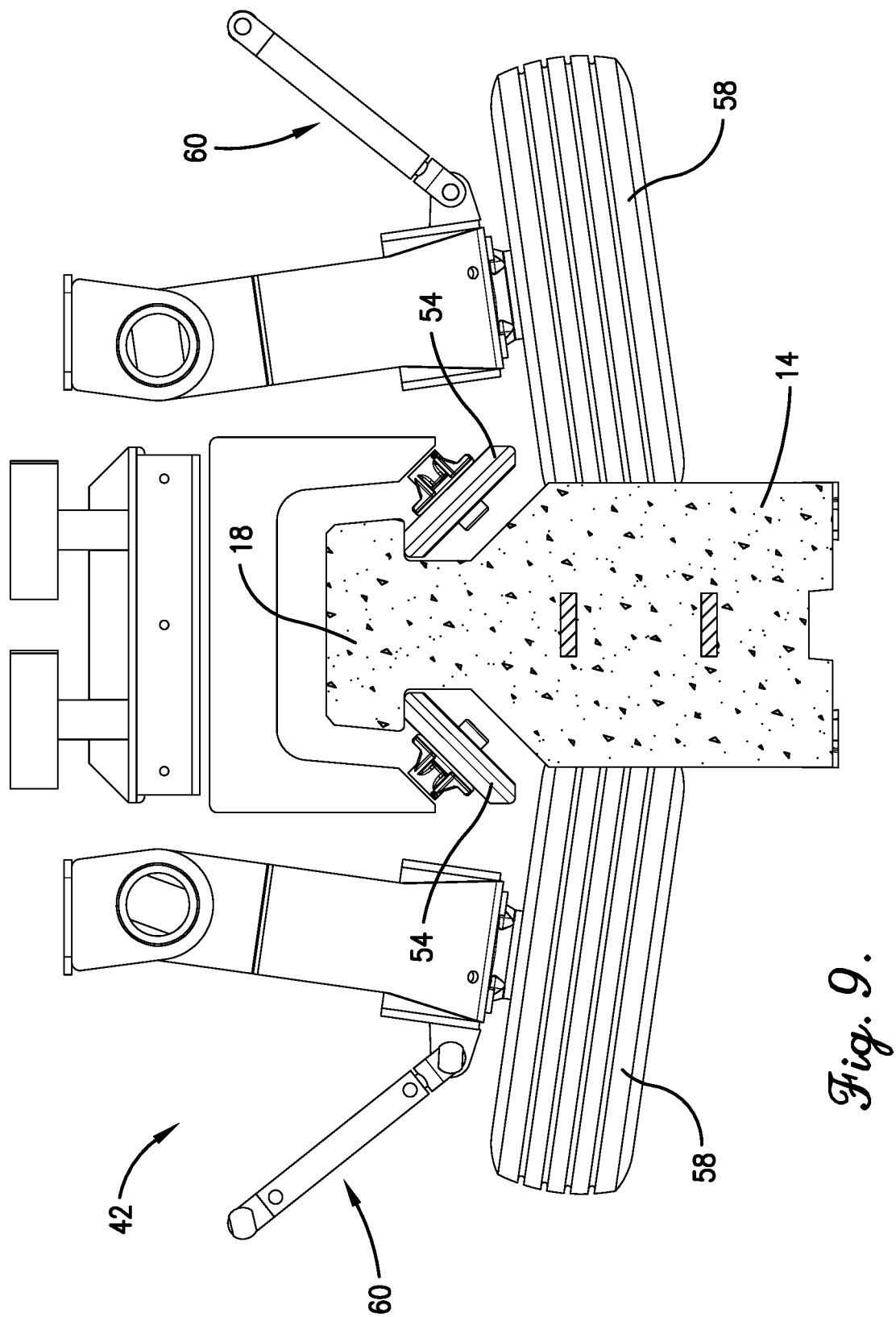
FIG. 9 is a vertical cross-sectional view of the barrier transfer machine taken along line 9/9 of FIG. 8 to better illustrate the capstan system.
Figure 10:
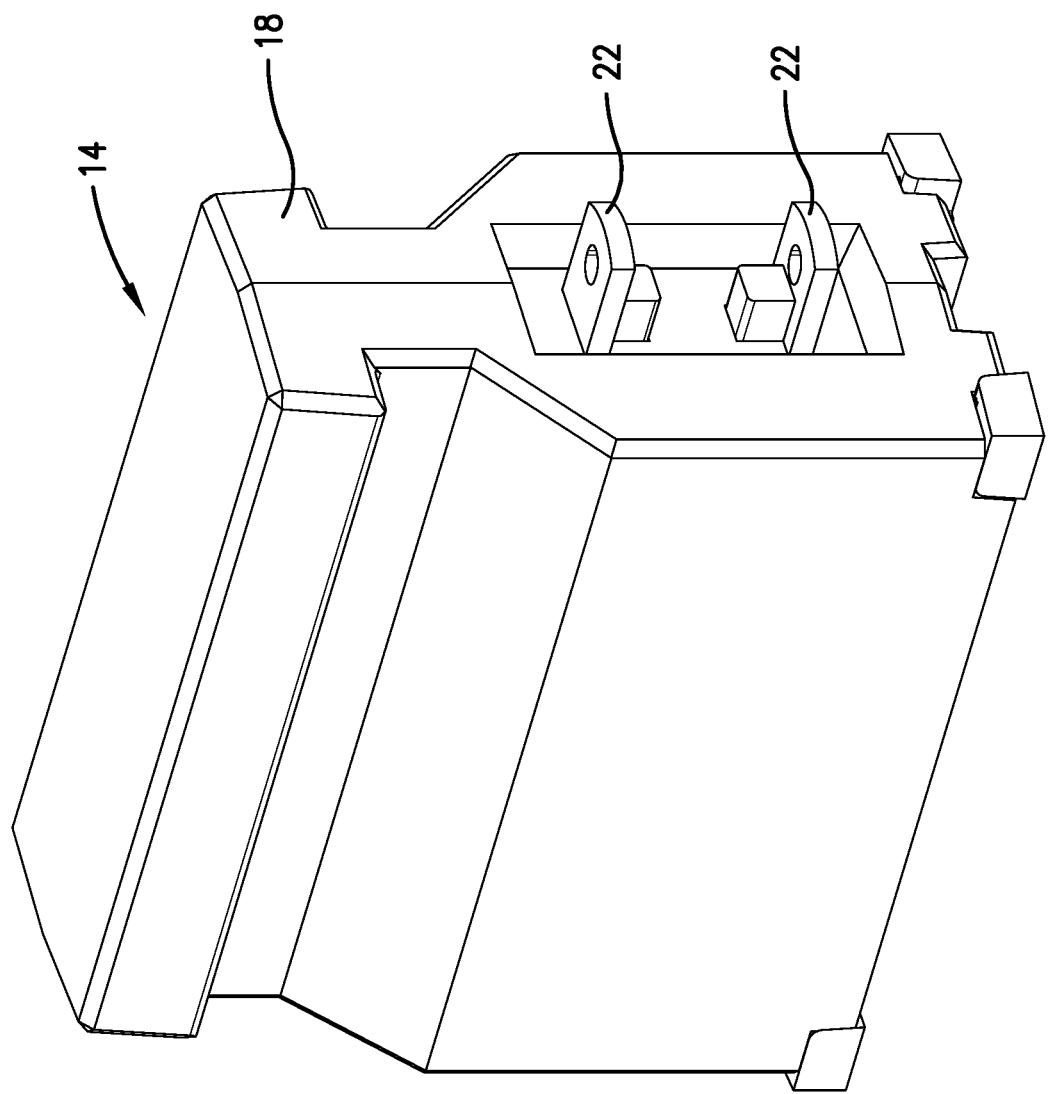
FIG. 10 is a right side perspective view of a fixed road barrier.
Figure 11:
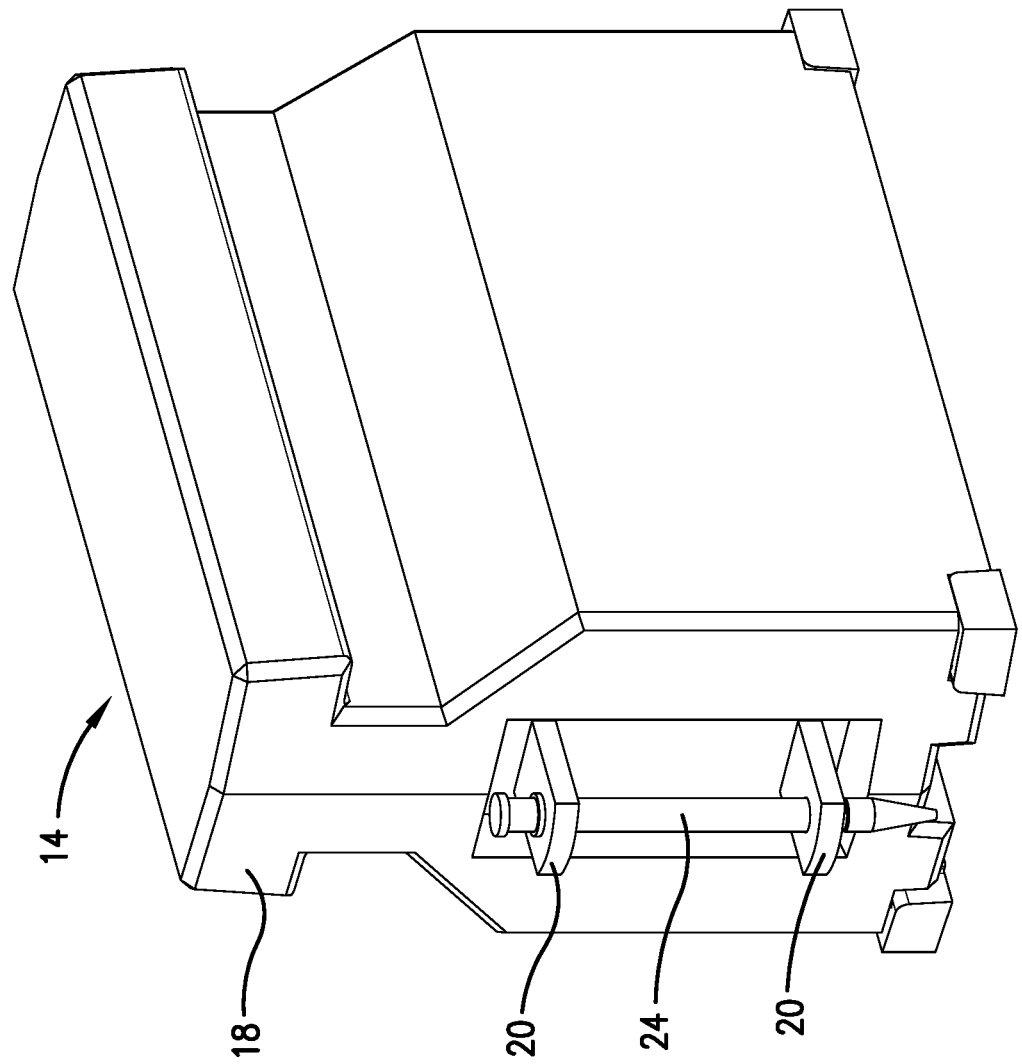
FIG. 11 is a left side perspective view of the fixed road barrier.

Examples of the fixed length barriers 14 are shown in FIGS. 10 and 11. The barriers 14 may be any type, shape, and size and may be formed of any suitable materials such as heavily reinforced concrete or high strength steel frames filled with concrete. In one embodiment, the barriers 14 have T-shaped tops 18 so they can be picked up and repositioned by bogey wheels of the barrier transfer machine as shown in FIG. 9 and described below.

Returning to FIGS. 10 and 11, one side of each barrier 14 includes fixed, spaced apart, connection flanges 20, and the opposite side includes spaced apart, spring biased, reactive tension elements 22. A steel rod 24 may be inserted through holes in the flanges 20 and tension elements 22 of adjacent barriers when they are aligned to interconnect the adjacent barriers. The reactive tension elements 22 allow adjacent barriers to move longitudinally relative to one another when the barriers are under tension or compression. In other embodiments, the fixed length barriers may not have reactive tension elements, but instead may have larger holes in the connection flanges that create "sloppy hinges" to accommodate some longitudinal movement between adjacent barriers.

Figure 12:
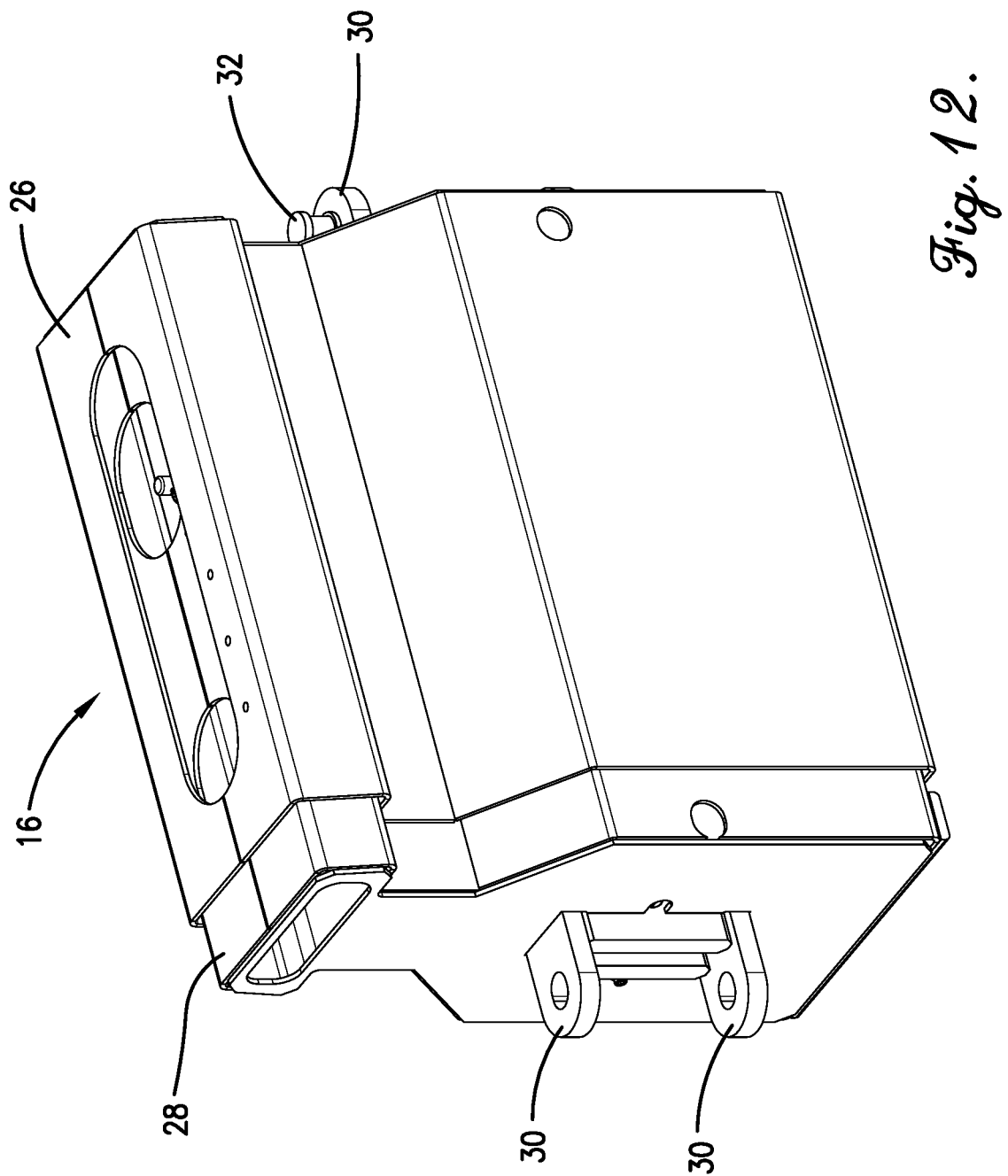
FIG. 12 is a perspective view of a variable length road barrier shown in its retracted position.
Figure 13:
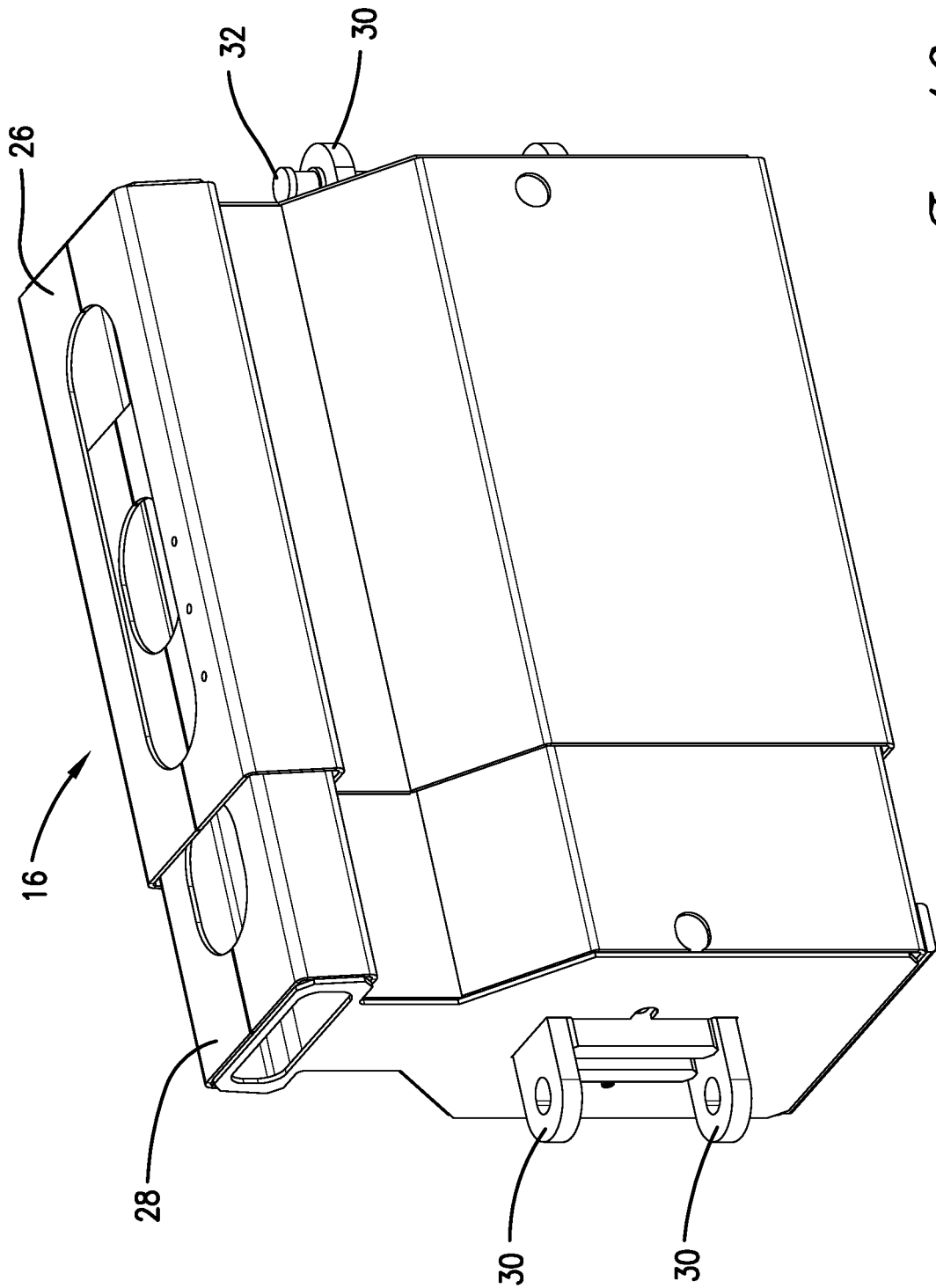
FIG. 13 is a perspective view of the variable length road barrier shown in its mid-stroke or neutral position.
Figure 14:
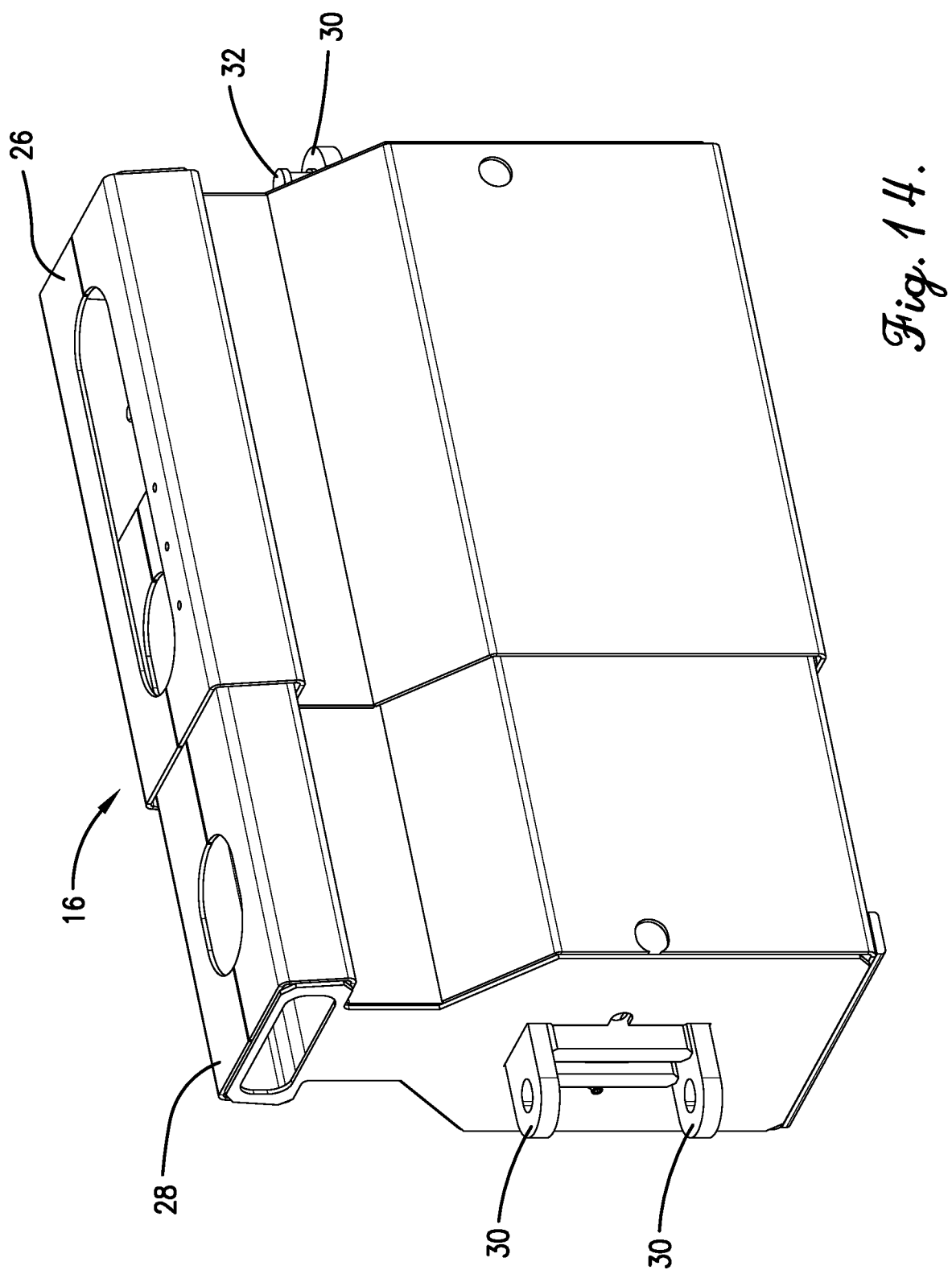
FIG. 14 is a perspective view of the variable length road barrier shown in its fully extended position.

Examples of the variable length barriers 16 are shown in FIGS. 12-14. The barriers may be any shape and size and each has an outer frame 26 and an inner telescoping structure 28 that may move in and out of the outer frame 26 when the barrier is subjected to tension or compression forces. The variable length barriers also include connection flanges 30 that may be aligned with and interconnected to the connection flanges of adjacent barriers with a steel rod 32. Movement of the telescoping inner structure 28 is resisted by internal hydraulic cylinders or other hydraulic or spring mechanisms.

FIG. 12 shows a variable length barrier 16 in its fully retracted or compressed state when subjected to a compressive force of a magnitude sufficient to fully compress the hydraulic cylinders or other biasing mechanisms. FIG. 14 shows the barrier 16 in its fully extended state when subjected to a tension force of a magnitude sufficient to fully extend the hydraulic cylinders or other biasing mechanisms. FIG. 13 shows the barrier in its neutral or steady state when it is not subjected to a compressive or tension force. More details of exemplary embodiments of variable length barriers are disclosed in U.S. Pat. No. 6,439,802, which is incorporated into the present application by reference in its entirety.

Aspects of the barrier transfer machine 10 will now be described in more detail with reference to FIGS. 1-9 and 16. An embodiment of the barrier transfer machine broadly comprises a moveable chassis 34, an entry snout 36, an exit snout 38, a conveyor system 40, a capstan system 42, and a tracking system 44. As described in more detail below, the tracking system 44 tracks and records current locations of road barriers as they are placed by the barrier transfer machine so the last locations of the barriers can be established for evidentiary purposes and/or for alerting operators or others of mis-positioned road barriers as described in more detail below.

The chassis 34 has a forward end and a rearward end disposed along a generally longitudinal axis that is essentially parallel to a roadway over which the machine is driven. The chassis 34 rides on wheels 46, belts, or other ground-engaging traction elements that are driven by conventional engines, transmissions, and associated mechanical and electrical components.

In one embodiment, the barrier transfer machine 10 is equipped with two cabs 48, 50, one at each end of the chassis 34. The machine 10 can be driven in either direction, but typically only one operator in one of the cabs can be in charge of the key controls at any one time. Usually the cab in control is the cab at the end of the machine pointing towards the direction in which the machine is traveling. In some embodiments, the machine 10 may only have one cab or even no cab, instead having various sensors and controls that provide autonomous operation without direct operator control or semi-autonomous operation with some operator control.

The entry snout 36 is mounted on a front end of the chassis and is configured for picking up the road barrier span from a first location on a road surface, and the exit snout 38 is mounted on the rear end of the chassis for placing the span back onto the road surface in a second location different from the first location. The snouts act as guides for the road barriers as they are picked up and/or dropped off and can be moved and adjusted by operators of the machine to align the snouts with the incoming road barriers and the desired placement positions. Each snout 36, 38 includes an array of bogey assemblies 52 supported on the conveyor frame described below. Each bogey assembly 52 comprises a number of carrier wheels 54 that pick up, carry, and/or lay down the barriers depending on the direction of travel of the machine.

Figure 5:
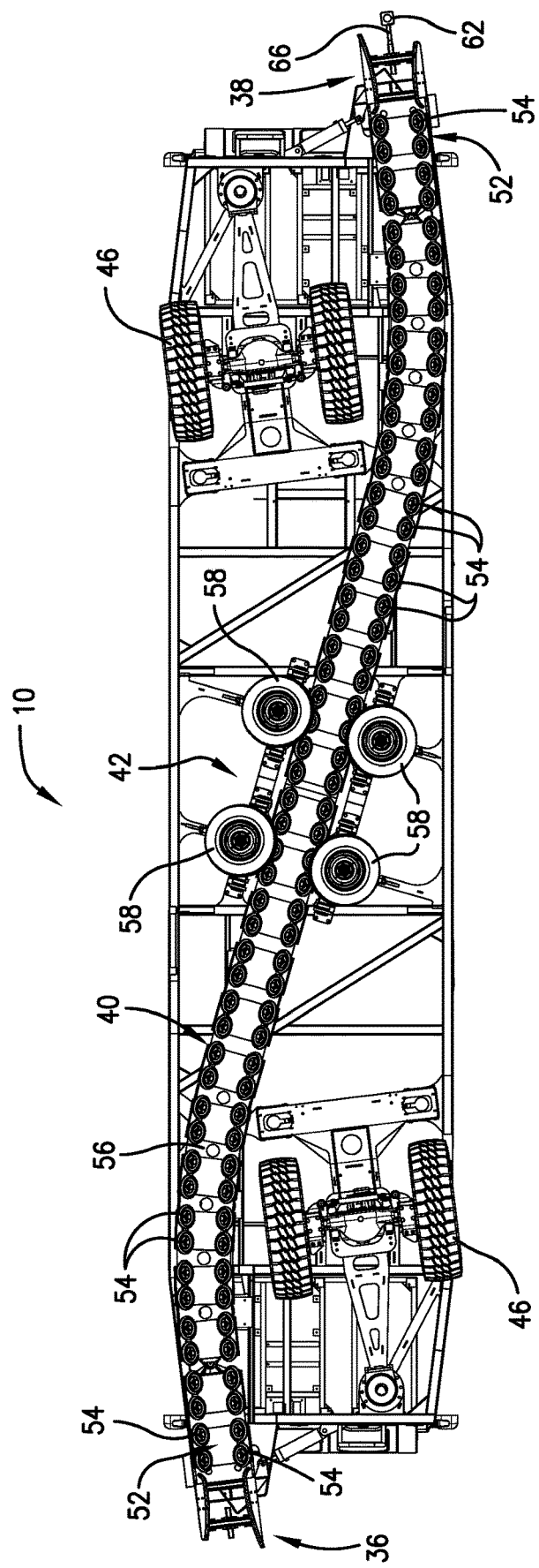
FIG. 5 is a bottom view of the barrier transfer machine.

The conveyor system 40 extends beneath the barrier transfer machine and is configured for transporting the span of road barriers from the entry snout 36 to the exit snout 38. The conveyor system 40 may be comprised of multiple assemblies and sections including straight sections, turn sections, and pickup/laydown sections connected to the snouts 36, 38. As best shown in FIG. 5, an embodiment of the conveyor system 40 comprises an S-shaped or otherwise curved structural frame 56 attached to the bottom of the machine and an array of bogey assemblies 52 supported to the frame. Each bogey assembly 52 comprises a number of carrier wheels 54 that pick up and carry the barriers through the machine during a barrier transfer operation.

The capstan system 42 is mounted alongside the conveyor system 40 and adjusts the tension or compression in the road barrier span 12 while it is being transported by the conveyor system in an attempt to keep the barrier span in its original longitudinal location relative to the road. As best shown in FIGS. 5 and 9, an embodiment of the capstan system 42 comprises a pair of large capstan wheels 58 on each side of the conveyor system, hydraulic cylinders, linkages, or other mechanisms 60 for urging the wheels against the road barriers as they pass by, and motors and pumps for driving the wheels so as to apply varying forward and rearward pressures on the road barriers. The capstan system 42 works by clamping the barriers with the capstan wheels 58 as they pass by on the conveyor system 42 and applying either forward or backward rotational pressure on the barriers. This alleviates excessive tension or compression in the span to reduce barrier migration and/or to reposition the barriers relative to one another.

Figure 16:
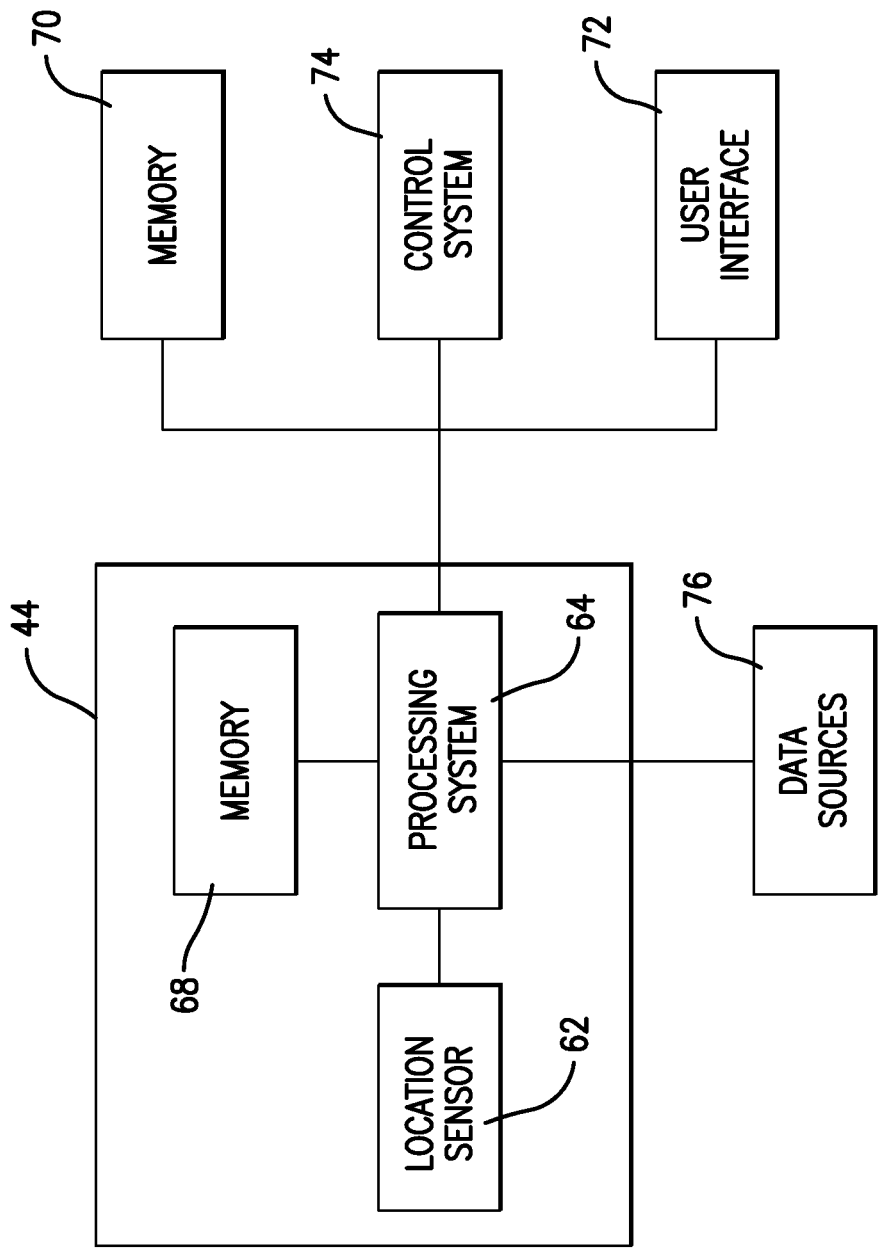
FIG. 16 is a block diagram depicting components of a tracking system of the barrier transfer machine.

Embodiments of the tracking system 44 will now be described in more detail. The tracking system 44 tracks and records current locations of the road barriers as they are placed by the barrier transfer machine so the last locations of the barriers can be established for evidentiary purposes and/or for alerting operators or others of mis-positioned road barriers. An embodiment of the tracking system 44 is depicted in FIG. 16 and broadly comprises at least one location sensor 62 and a processing system 64. The tracking system 44 may be a stand-alone system or may be incorporated in other control systems of the barrier transfer machine 10.

The location sensor 62 is mounted on the barrier transfer machine 10 and senses the locations of road barriers as they are placed on a road surface. The location sensor 62 may be any sensing device and/or combinations of devices operable to sense coordinates or relative positions of the road barriers as they are placed on the road surface and generate corresponding location data.

In one embodiment, the location sensor 62 is a global navigation satellite system (GNSS) receiver such as a GPS receiver, Glonass receiver, Galileo receiver, or compass system receiver operable to receive navigational signals from satellites to calculate positions of the barriers as a function of the signals. The GNSS receiver may include one or more processors, controllers, or other computing devices and memory for storing information accessed and/or generated by the processors or other computing devices and may include or be coupled with a patch antenna, helical antenna, or any other type of antenna. The GPS or other GNSS receiver is configured to sense the geographic coordinates of each road barrier as it is placed on a roadway.

Figure 3:
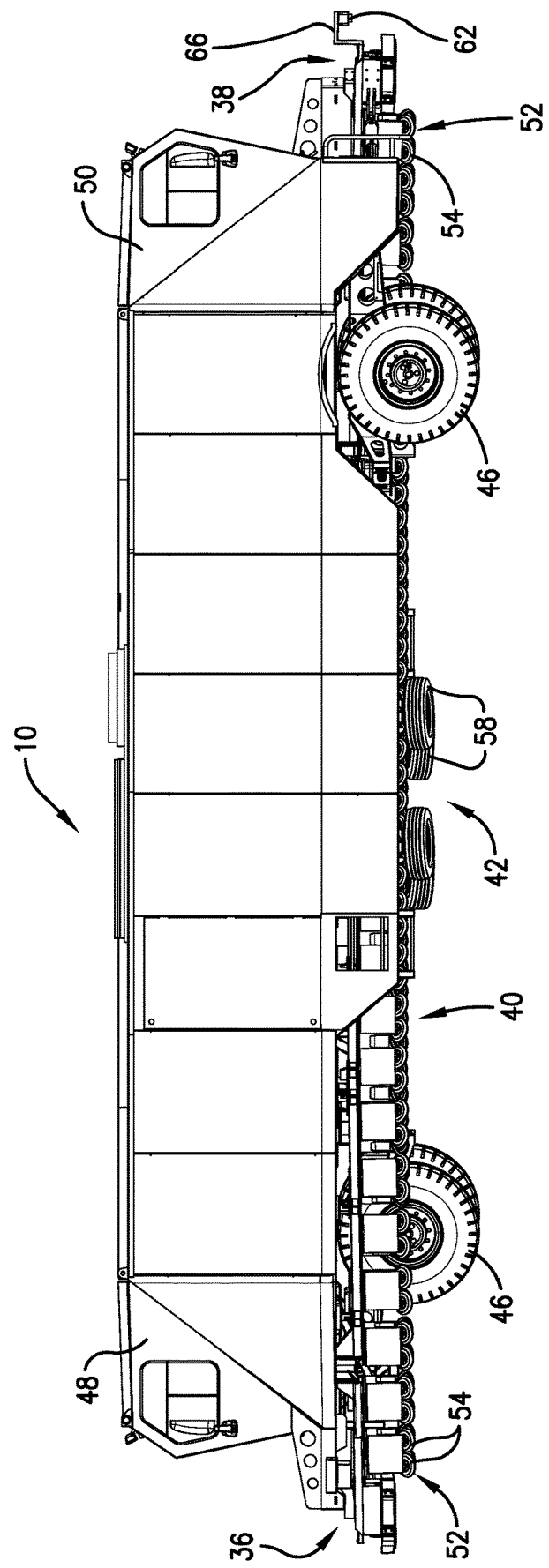
FIG. 3 is a side view of the barrier transfer machine.
Figure 4:
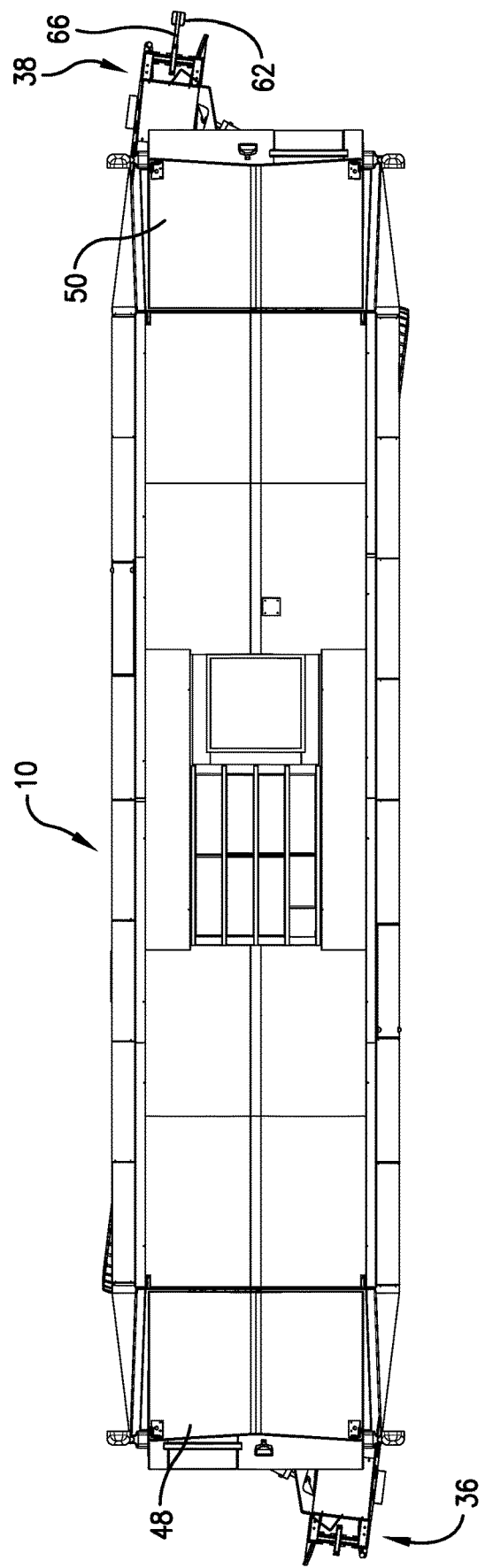
FIG. 4 is a top view of the barrier transfer machine.
Figure 7:
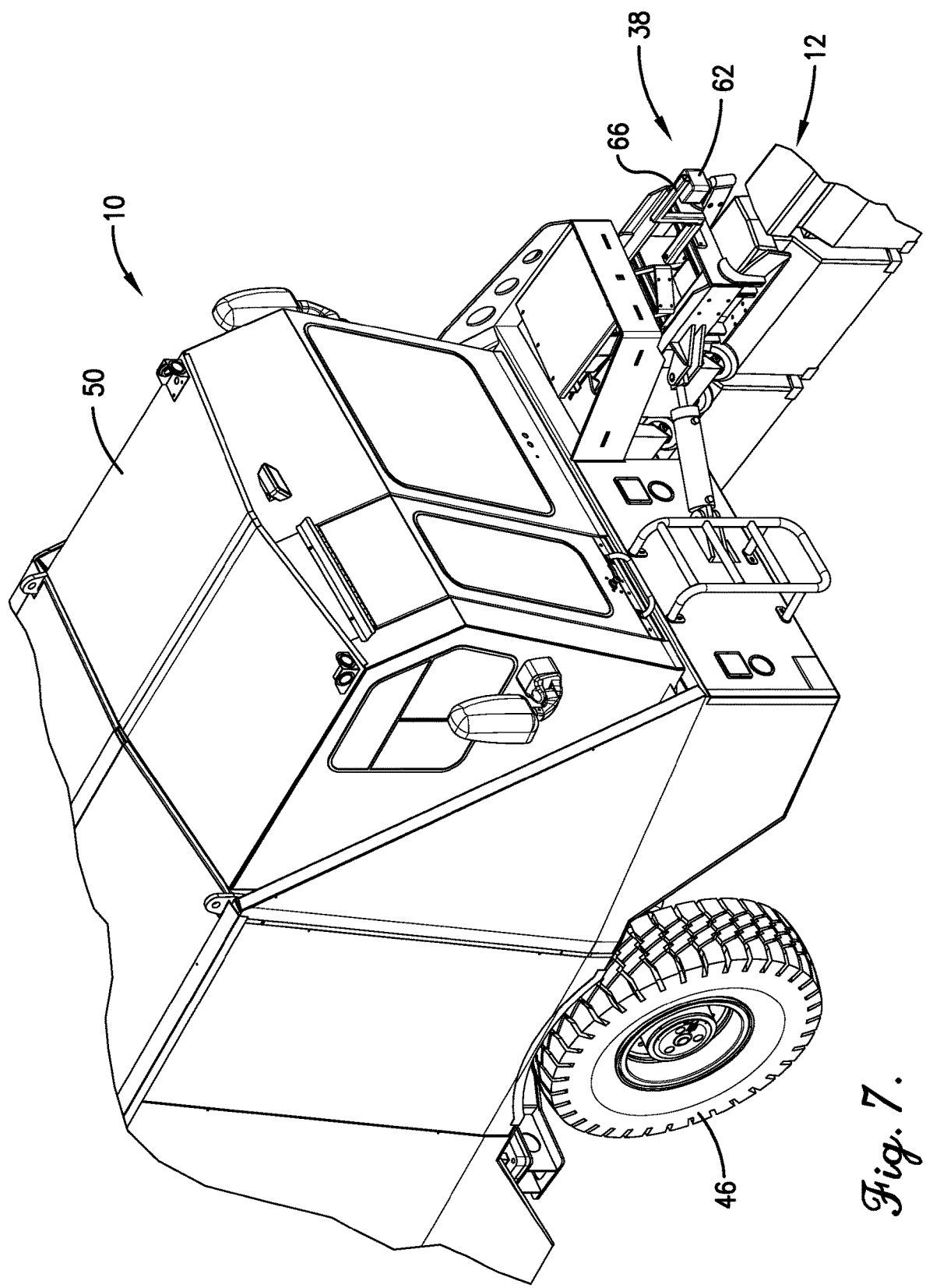
FIG. 7 is a fragmentary front perspective view of the barrier transfer machine shown picking up a span of road barriers.
Figure 8:
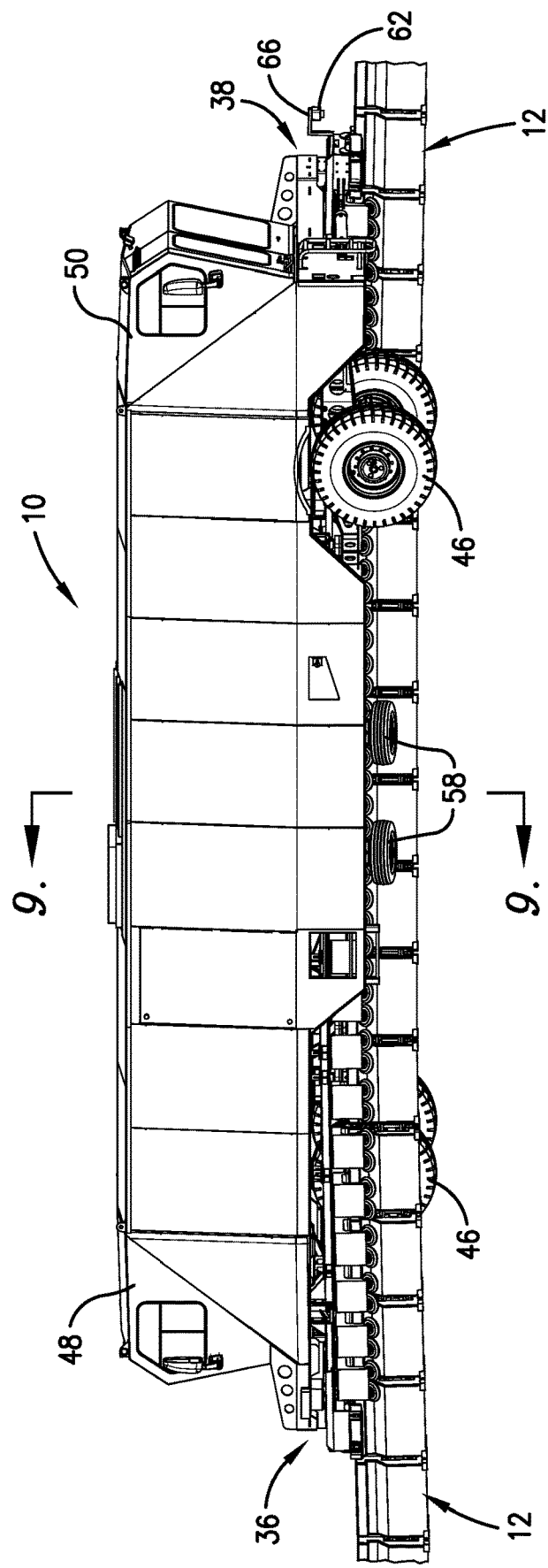
FIG. 8 is a side view of the barrier transfer machine shown picking up and repositioning a span of road barriers.

As best illustrated in FIGS. 3 and 7, the GPS or other GNSS receiver 62 may be mounted on a support arm 66 extending behind the exit snout 38 so it is suspended directly above the location at which each barrier is placed on the ground by the barrier transfer machine. The GPS or other GNSS receiver 62 and/or the processing system 64 may be triggered by a switch or other mechanism so that the processing system records the coordinates of the center of each road barrier as the road barriers are placed on the ground. In other embodiments, the GPS or other GNSS receiver may be mounted elsewhere on the machine, and the processing system is configured to compensate so the location readings correspond to the coordinates of the centers of the road barriers as they are placed on the ground. In other embodiments, the GPS or other GNSS receiver 62 may acquire multiple coordinates for each road barrier such as the locations of the ends and the center of each barrier. In still other embodiments, the GPS or other GNSS receiver may acquire greater or fewer coordinates for the road barriers.

In other embodiments, the location sensor 62 may be a camera mounted on the exit snout for capturing images of the road barriers as they are placed on the road surface and generating associated image data. This image data indicates the relative positions of the road barriers versus lane markers, roadway shoulders, and other markers shown in the images.

In some embodiments, the tracking system may comprise multiple location sensors including the above-described GPS receiver, the camera, and/or additional sensors.

The processing system 66 receives data from the location sensor 62 or sensors including the above-described location data, image data, and possibly other data representative of the current locations of the road barriers. The processing system 64 saves the location data, image data, and other data in resident memory 68 or in external memory 70. The processing system 64 may also store date/time data representative of a date and time the road barriers were placed on the road surface. This date/time data may also be stored in the resident memory 68 or in the external memory 70. The stored data may be later accessed to provide evidence of the locations of the barriers at any day and time. For example, if the barriers are stuck by a vehicle, the data associated with the day and time of the collision may be accessed to determine where the barriers were located immediately before the collision. The tracking system therefore provides a searchable log of the locations of the barriers on any day and time. In some embodiments, the log may be stored on a website or other publicly-accessible computer system so that anyone, including insurance adjustors, law enforcement people, etc. can access the log and determine the locations of the barriers on any day and time.

Because the road barriers may be placed on bridges or other structures which may sway, shift, or otherwise move over time, the processing system 64 may also correct or augment the location data as necessary to account for any such movement. In one embodiment, this may be accomplished by receiving current location data from one or more GPS receivers mounted to the bridge or other structures, comparing such current location data to reference location data for the structure, and generating corrections factors that may be used to correct or augment the location data for the road barriers. The reference location data for the bridge or other structure may be data representative of the steady-state location of the structure, i.e., the location of the structure when in its initial non-moved position.

The processing system 64 may also compare the current locations of the road barriers to reference locations to determine if the road barriers are currently mis-positioned. If they are mis-positioned, the processing system 64 may generate an alert signal. The alert signal may trigger an alarm, display, or instructions on a user interface 72 in the barrier transfer machine 10 so that an operator may reposition the barriers or take other corrective action. In other embodiments, the alert signal may be sent to a control system 74 in the barrier transfer machine so the machine may take corrective action and/or a to remote computer or control station for remote monitoring and control purposes.

The reference locations may be stored in the memory 68, the memory 70, or in other data sources 76 such as resident memory in another control system in the barrier transfer machine, external computers, and/or computers, smart phones, and other electronic devices used by operators of the machine. Such reference data may include coordinates of the barriers when they were first installed, coordinates of the barriers when they were last re-positioned, and/or coordinates for desired locations of the barriers.

In some embodiments, the processing system 64 only generates an alert signal if it determines the locations of the road barriers deviate from the reference locations by more than a threshold amount. The threshold amount may be user-selected and may vary depending on the environment in which a road barrier system is placed. For example, in environments with tight lanes and high-speed traffic, the threshold amount may be small, such as 1". But in environments with more space and slower traffic, such as in parking lots, the threshold amount may be larger, such as 1'.

The tracking system 44 may also comprise a data transmitter for transmitting the location data, the date/time data, the alert signal, and other data to the memory 70, the user interface 72, the control system 74, and/or other devices. The data transmitter may be any device capable of transmitting data via wired or wireless connections. The data transmitter may be, or include, a wired or wireless network adapter or a wireless data transceiver for use with Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMAX) and the like.

Figure 17:
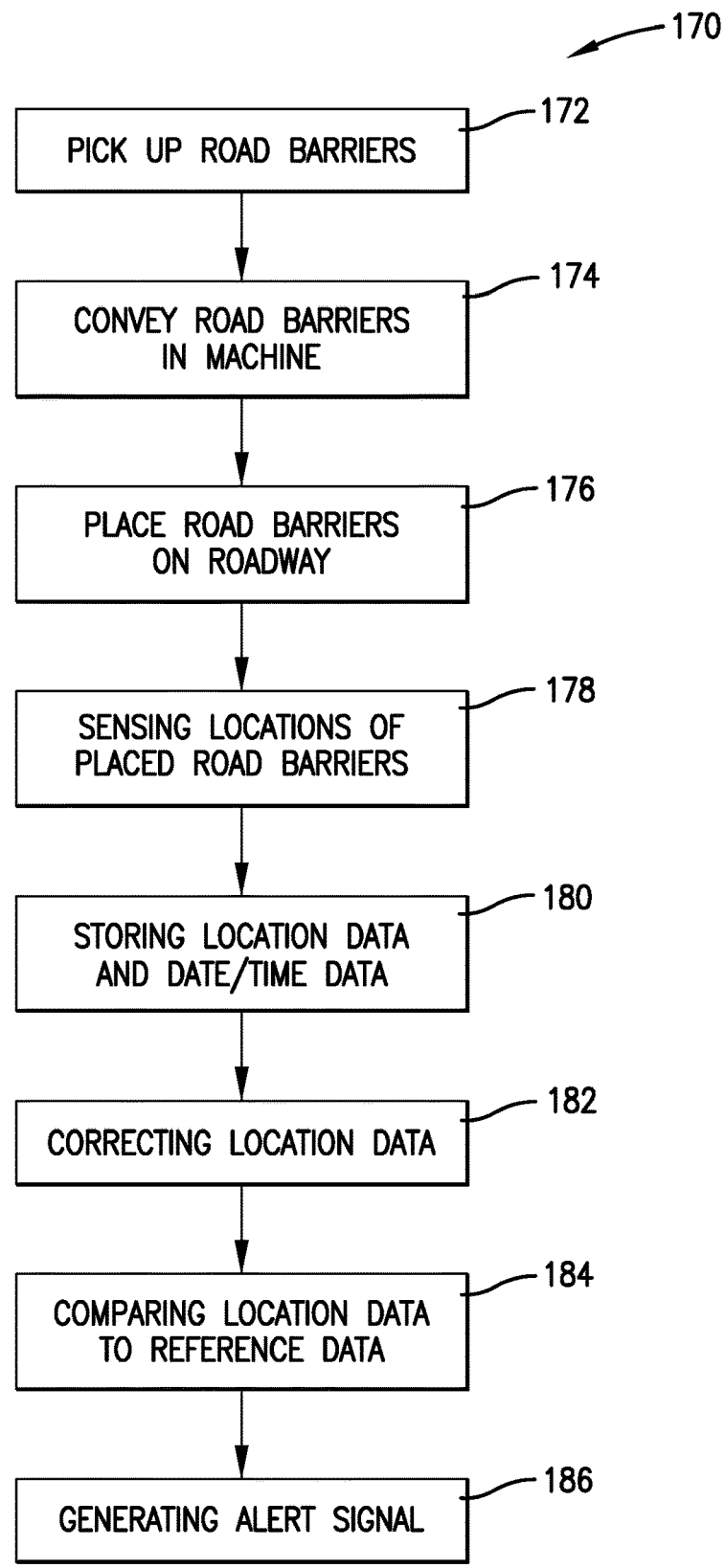
FIG. 17 is a flow diagram depicting exemplary steps of a method of the present invention.

Another embodiment of the invention is a method 170 of moving road barriers with a barrier transfer machine such as the one described and illustrated herein. The flow chart of FIG. 17 shows exemplary steps in an embodiment of the method 170. In some alternative implementations, the steps or functions noted in the various blocks may occur out of the order depicted in FIG. 17. For example, two blocks shown in succession in FIG. 17 may in fact be executed substantially concurrently, or the blocks may sometimes be executed in the reverse order depending upon the functionality involved.

An embodiment of the method 170 comprises picking up the road barriers from a road surface as depicted in box 172. The method further comprises transporting the road barriers in the barrier transfer machine as depicted in box 174. The method further comprises placing the road barriers back onto the road surface as depicted in box 176.

The method further comprises sensing locations of the road barriers as they are placed onto the road surface with a sensor mounted on the barrier transfer machine as depicted in box 178. The sensor may be one or more of the sensors described above.

The method further comprises storing location data representative of the locations of the road barriers as they are placed onto the road surface as depicted in box 180. The location data may be stored in memory coupled with or in communication with the processing system as described above. The method further comprises storing date/time data representative of a date and time the road barriers were placed on the road surface as depicted in box 180. The location data may be stored in memory coupled with or in communication with the processing system described above.

The method further comprises correcting or augmenting the location data as necessary to account for any movement of the road surface on which the road barriers are placed as depicted in box 182. In one embodiment, this step includes receiving current location data from one or more GPS receivers mounted to the road surface, comparing such current location data to reference location data, and generating corrections factors that may be used to correct or augment the location data for the road barriers.

The method further comprises comparing the current locations of the road barriers to reference locations to determine if the road barriers are currently mis-positioned as depicted in box 184. The comparing step may be performed with the processing system described above. The method further comprises generating an alert signal if the barriers are mis-positioned as depicted in box 186. The comparing step may be performed with the processing system described above, and the alert signal may be sent to a user interface, a control system on the machine, or an external control system.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as the processing system 64, other processing elements, etc., may be implemented as special purpose or as general purpose. For example, the processing system 64 may comprise dedicated circuitry or logic that is permanently configured, such as an application-specific integrated circuit (ASIC), or indefinitely configured, such as an FPGA, to perform certain operations. The processing system 64 also comprise programmable logic or circuitry (e.g., as encompassed within a general-purpose processor or other programmable processor) that is temporarily configured by software to perform certain operations. It will be appreciated that the decision to implement the processing system as special purpose, in dedicated and permanently configured circuitry, or as general purpose (e.g., configured by software) may be driven by cost and time considerations.

Accordingly, the term "processing system" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing system is temporarily configured (e.g., programmed), each of the processing elements need not be configured or instantiated at any one instance in time. For example, where the processing system comprises a general-purpose processor configured using software, the general-purpose processor may be configured as respective different processing elements at different times. Software may accordingly configure the processing element to constitute a hardware configuration at one instance of time and to constitute a different hardware configuration at a different instance of time.

Computer hardware components, such as the processing system 64, associated memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, later, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A barrier transfer machine for picking up and repositioning a plurality of road barriers, the barrier transfer machine comprising:
    an entry snout for picking up the road barriers from a road surface;
    an exit snout for placing the road barriers back onto the road surface;
    a conveyor system positioned between the entry snout and the exit snout for transporting the road barriers from the entry snout to the exit snout; and
    a tracking system for tracking a location of each of the road barriers as it is placed onto the road surface, the tracking system comprising:
        a location sensor mounted on the barrier transfer machine for sensing the location of each of the road barriers as is it placed onto the road surface;
        a memory configured to retain location data representative of the location of each of the road barriers as it is placed onto the road surface and temporal data representative of at least one of a date and time of placement of the road barriers onto the road surface so that the temporal data is mapped to the location data, the location data for each of the road barriers including a plurality of coordinates corresponding to ends and a center of the road barrier; and
        a processing system in communication with the location sensor and the memory, the processing system being configured to:
            store the location data and the temporal data on the memory as a first entry;
            generate a searchable log of the location data and temporal data via the memory;
            add location data and temporal data to the searchable log each time the road barriers are repositioned on the road surface while retaining all previously stored location data and temporal data such that the searchable log forms an evidentiary chain of locations of the road barriers going back to the first entry;
            after the road barriers have been repositioned on the road surface, query the searchable log via the temporal data; and
            output location data based on the query for determining a location of one of the plurality of road barriers at a temporal point represented by the temporal data.

2. The barrier transfer machine as set forth in claim 1, wherein the processing system is further configured for comparing the location data to reference location data to determine if the location of each of the road barriers as it is placed onto the road surface deviates from a reference location.

3. The barrier transfer machine as set forth in claim 2, wherein the processing system is further configured for generating an alert signal if it determines the location of one of the road barriers as it is placed onto the road surface deviates from the reference location by more than a threshold amount.

4. The barrier transfer machine as set forth in claim 3, further comprising a data transmitter in communication with the processing system for transmitting the location data and the alert signal to a remote computing device.

5. The barrier transfer machine as set forth in claim 1, wherein the road surface is a roadway; a shoulder of a roadway; a driving lane on a bridge surface; a shoulder of a bridge surface; a parking lot; an on-ramp; or an off-ramp.

6. The barrier transfer machine as set forth in claim 1, wherein the location sensor is a GNSS receiver mounted on the exit snout for sensing geographic coordinates of each of the road barriers as is it placed onto the road surface.

7. The barrier transfer machine as set forth in claim 1, wherein the location sensor is a camera for capturing an image of each of the road barriers as it is placed onto the road surface and generating image data representative of the image.

8. The barrier transfer machine as set forth in claim 1, wherein the location sensor includes a GPS receiver and a camera.

9. A barrier transfer machine for picking up and repositioning road barriers, the barrier transfer machine comprising:
    an entry snout mounted on a front end of the barrier transfer machine for picking up the road barriers from a road surface;
    an exit snout mounted on a rear end of the barrier transfer machine for placing the road barriers back onto the road surface;
    a conveyor system positioned between the entry snout and the exit snout for transporting the road barriers from the entry snout to the exit snout; and
    a tracking system for tracking locations of the road barriers as they are placed onto the road surface, the tracking system comprising:
        a location sensor mounted on the barrier transfer machine for sensing the locations of each of the road barriers as they are placed onto the road surface;
        a memory configured to retain location data representative of the location of each of the road barriers as it is placed onto the road surface and temporal data representative of at least one of a date and time of placement of the road barriers onto the road surface so that the temporal data is mapped to the location data, the location data for each of the road barriers including a plurality of coordinates corresponding to ends and a center of the road barrier; and
        a processing system in communication with the position sensor and the memory, the processing system being configured to:

store the location data and the temporal data on the memory as a first entry;

generate a searchable log of the location data and temporal data via the memory;

add location data and temporal data to the searchable log each time the road barriers are repositioned on the road surface while retaining all previously stored location data and temporal data such that the searchable log forms an evidentiary chain of locations of the road barriers going back to the first entry;

after the road barriers have been repositioned on the road surface, query the searchable log via the temporal data;

output location data based on the query for determining a location of one of the plurality of road barriers at a temporal point represented by the temporal data; and compare the location data to reference location data to determine if the locations of the road barriers deviate from the reference locations.

10. The barrier transfer machine as set forth in claim 9, wherein the road surface is a roadway; a shoulder of a roadway; a driving lane on a bridge surface; a shoulder of a bridge surface; a parking lot; an on-ramp; or an off-ramp.

11. The barrier transfer machine as set forth in claim 9, wherein the processing system is further configured for generating an alert signal if the locations of the road barriers deviate from the reference locations by more than a threshold amount.

12. The barrier transfer machine as set forth in claim 11, further comprising a data transmitter in communication with the processing system for transmitting the location data, the temporal data, and the alert signal to a remote computing device.

13. The barrier transfer machine as set forth in claim 9, wherein the location sensor is a GNSS receiver mounted on the exit snout.

14. The barrier transfer machine as set forth in claim 9, wherein the location sensor is a camera for capturing images of the road barriers as they are placed onto the road surface and generating image data representative of the images.

15. The barrier transfer machine as set forth in claim 9, wherein the location sensor includes a GNSS receiver and a camera mounted on the exit snout.

16. A method of moving road barriers, the method comprising:

picking up the road barriers from a road surface with an entry snout of a barrier transfer machine;

transporting the road barriers from the entry snout to an exit snout of the barrier transfer machine with a conveyor system;

placing the road barriers back onto the road surface with the exit snout;

sensing locations of the road barriers as they are placed onto the road surface with a sensor mounted on the barrier transfer machine;

storing location data representative of the locations of the road barriers as they are placed onto the road surface onto a memory, the location data for each of the road barriers including a plurality of coordinates corresponding to ends and a center of the road barrier;

storing temporal data representative of a date and time the road barriers were placed on the road surface onto the memory so that the temporal data data is mapped to the location data, the location data and temporal data being a first entry;

generating a searchable log of the location data and temporal data via the memory;

adding location data and temporal data to the searchable log each time the road barriers are repositioned on the road surface while retaining all previously stored location data and temporal data such that the searchable log forms an evidentiary chain of locations of the road barriers going back to the first entry;

after the road barriers have been repositioned on the road surface, querying the searchable log via the temporal data; and outputting location data based on the query to determine a location of one of the plurality of road barriers at a date or time represented by the temporal data.

17. The method as set forth in claim 16, further comprising the step of augmenting the location data to account for movement of the road surface on which the road barriers are placed.

18. The method as set forth in claim 16, further comprising the steps of comparing the location data to reference location data and generating an alert signal if the locations of the road barriers deviate from reference locations by more than a threshold amount.

19. The method as set forth in claim 18, further comprising the step of sending the alert signal to an operator of the barrier transfer machine.

* * * * *